(12) United States Patent
Evans et al.

(10) Patent No.: US 10,133,141 B2
(45) Date of Patent: Nov. 20, 2018

(54) MACH-ZEHNDER INTERFEROMETER HAVING BENDED WAVEGUIDES

(75) Inventors: Peter W. Evans, Mountain House, CA (US); Scott Corzine, Sunnyvale, CA (US); Mehrdad Ziari, Pleasanton, CA (US); Pavel V. Studenkov, Cupertino, CA (US); Masaki Kato, Palo Alto, CA (US); Charles H. Joyner, Haleiwa, HI (US)

(73) Assignee: Infinera Corporation, Sunnyvale, CA (US)

( * ) Notice: Subject to any disclaimer, the term of this patent is extended or adjusted under 35 U.S.C. 154(b) by 324 days.

(21) Appl. No.: 13/341,248

(22) Filed: Dec. 30, 2011

(65) Prior Publication Data

US 2013/0170782 A1 Jul. 4, 2013

(51) Int. Cl.
*G02F 1/035* (2006.01)
*G02F 1/295* (2006.01)
*G02F 1/225* (2006.01)

(52) U.S. Cl.
CPC ............ *G02F 1/225* (2013.01); *G02F 1/2257* (2013.01); *G02F 2201/18* (2013.01)

(58) Field of Classification Search
CPC ... G02B 6/125; G02F 2001/212; G02F 1/035; G02F 1/0353; G02F 1/3137; G02F 1/0147

USPC ...................... 385/1–3, 8, 14, 15, 39, 40, 45
See application file for complete search history.

(56) References Cited

U.S. PATENT DOCUMENTS

| | | | | |
|---|---|---|---|---|
| 6,122,416 | A * | 9/2000 | Ooba et al. ...................... 385/16 |
| 6,507,681 | B1 * | 1/2003 | Kowalczyk ............. G02F 1/065 385/131 |
| 2004/0208421 | A1* | 10/2004 | Kitagawa ............... G01K 11/00 385/16 |
| 2006/0056002 | A1* | 3/2006 | Wooten ................... G02F 1/225 359/245 |
| 2006/0159384 | A1* | 7/2006 | Sugiyama ........................ 385/3 |
| 2009/0022444 | A1* | 1/2009 | Chen et al. ....................... 385/1 |
| 2011/0019956 | A1* | 1/2011 | Sugiyama ............... G02F 1/035 385/2 |

* cited by examiner

*Primary Examiner* — Kaveh C Kianni
*Assistant Examiner* — Hung Lam
(74) *Attorney, Agent, or Firm* — David L. Soltz

(57) ABSTRACT

Consistent with the present disclosure, both arms of an MZ interferometer are "double-folded" and are bent in at least two locations to define first and second acute inner angles. Accordingly, the arms of the MZ interferometer may have substantially the same length, and, further, the MZ interferometer has a more compact geometry. In one example, the arms parallel each other and have a serpentine shape, and, in a further embodiment, the arms parallel one another and have a Z-shape. Accordingly, since the temperature of a PIC upon which the MZ interferometer is provided does not vary significantly over such short distances, the temperatures of both arms is substantially the same.

13 Claims, 14 Drawing Sheets

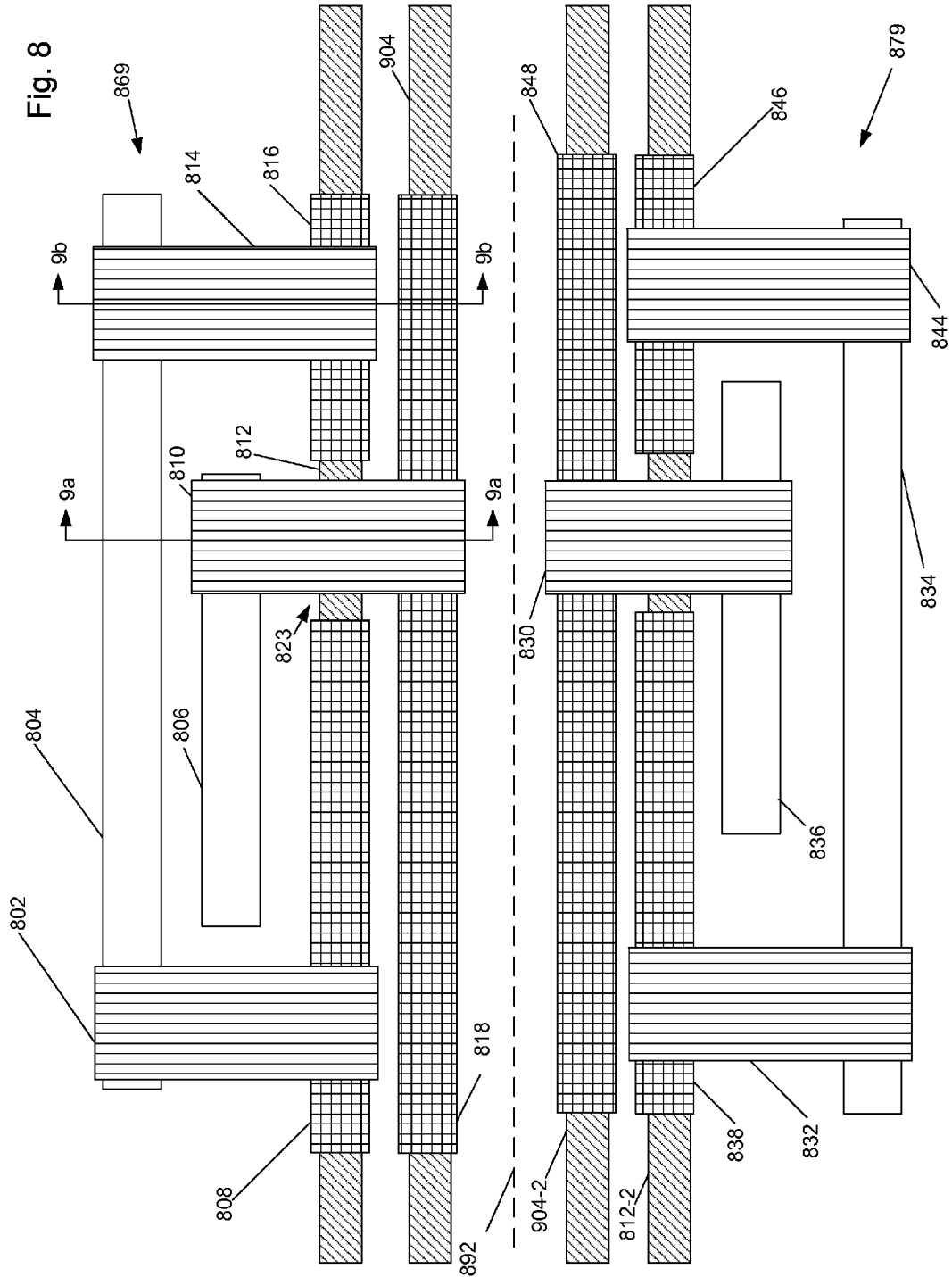

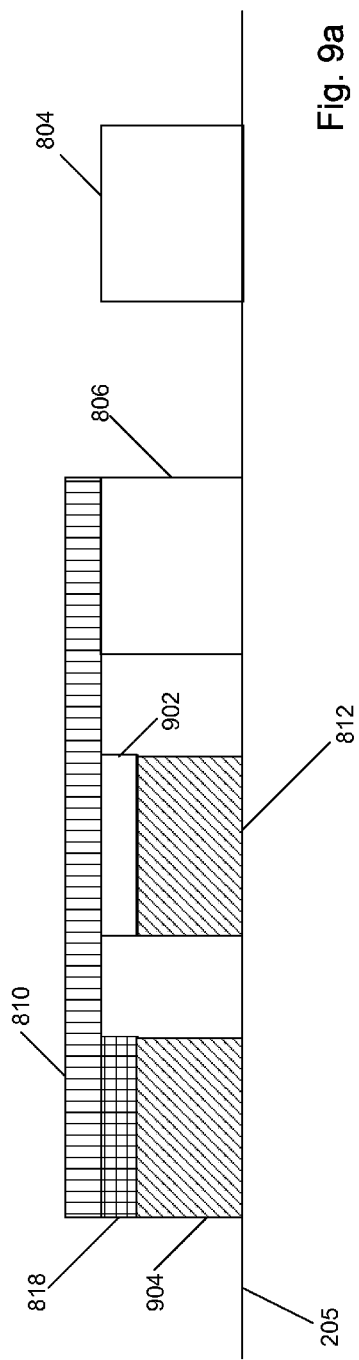
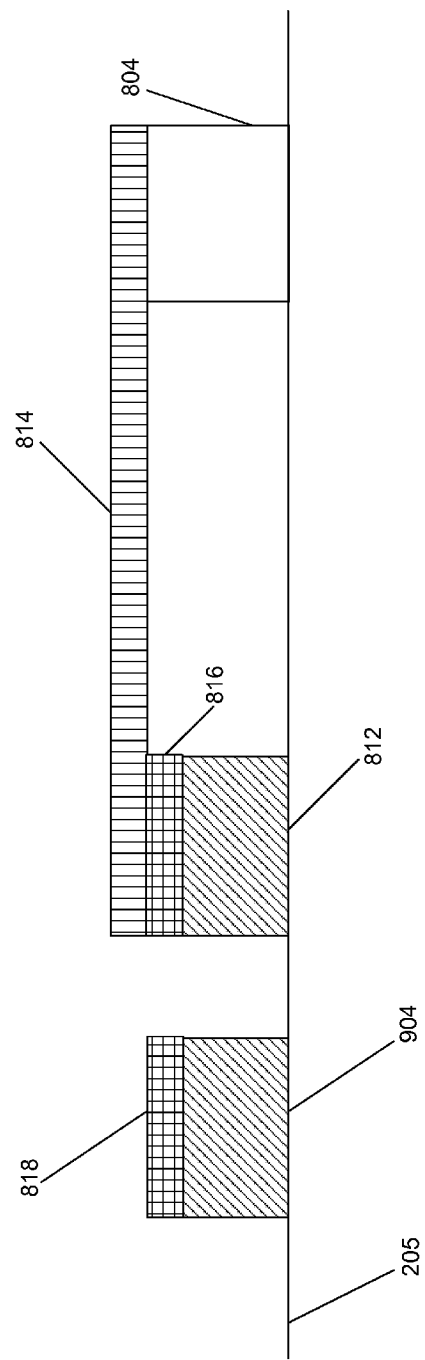

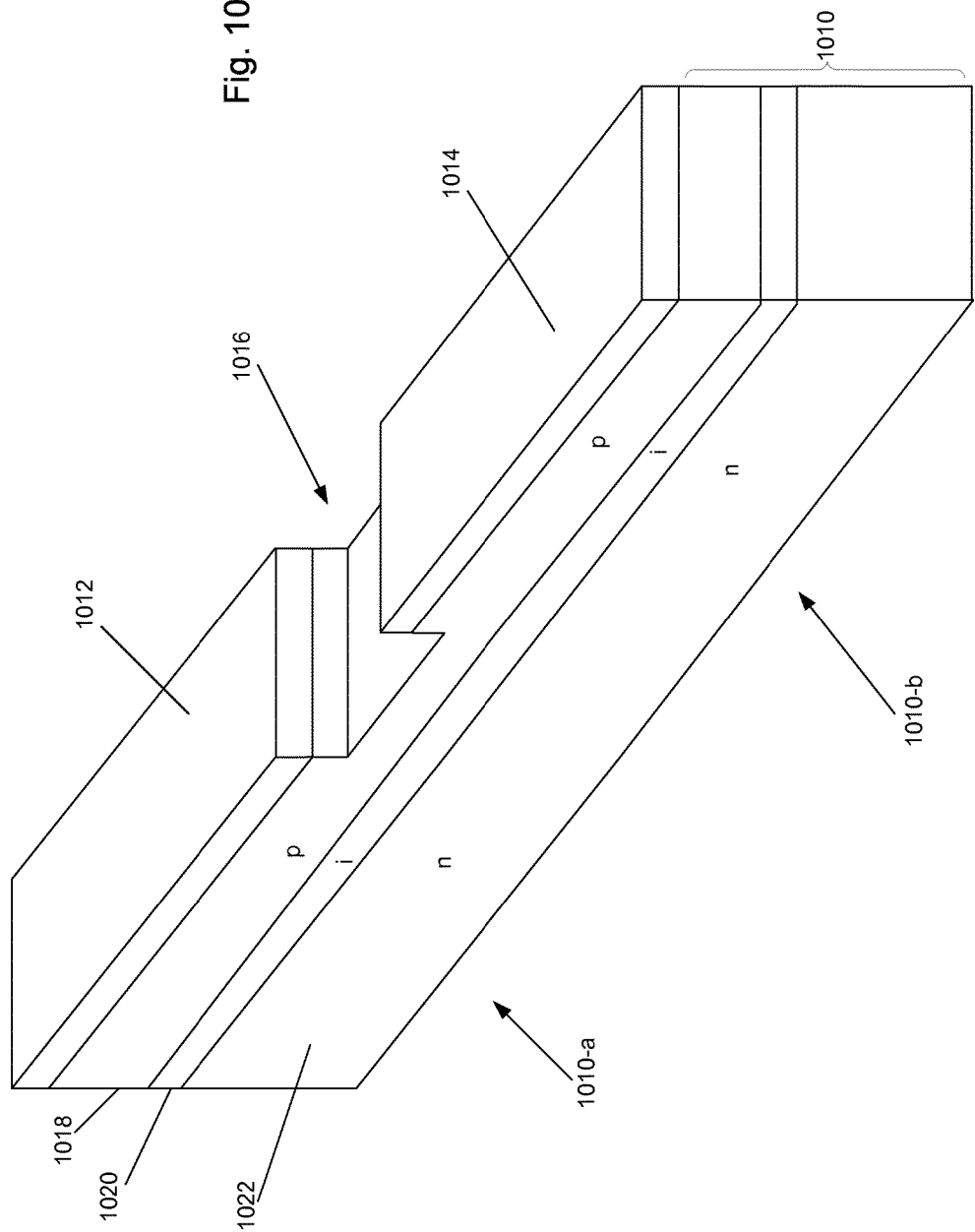

MACH-ZEHNDER INTERFEROMETER HAVING BENDED WAVEGUIDES

BACKGROUND

Wavelength division multiplexed (WDM) optical communication systems are known in which multiple optical signals, each having a different wavelength, are combined onto a single optical fiber to provide a WDM signal. Such systems typically include transmitters having a laser associated with each wavelength, a modulator configured to modulate the output of the laser to carry data, and an optical combiner to combine each of the modulated outputs. Receivers are also provided to demultiplex the received WDM signal into individual optical signals, convert the optical signals into electrical signals, and output data carried by those electrical signals.

Conventionally, WDM systems have been constructed from discrete components. For example, lasers and modulators have be packaged separately and provided on a printed circuit board. More recently, however, many WDM components have been integrated onto a semiconductor chip, also referred to a photonic integrated circuit (PIC). In particular, lasers and modulators have been integrated together on a common substrate along with the optical combiner.

Conventional optical modulators include Mach-Zehnder (MZ) modulators or interferometers, which typically include first and second waveguides or farms, the ends of which are optically coupled to one another. Electrodes may be provided on one or both of the first and second arms, such that biases or drive signals corresponding to the transmitted data are applied to the electrodes to thereto change the refractive index therein. As a result, the phase and/or amplitude of light in one or both of the arms can be modulated or varied in accordance with the transmitted data.

Typically, the bias supplied to the electrode is centered about a "null" of a transfer function associated with the MZ interferometer. If the lengths of the MZ arms or optical path lengths are not matched, changes in temperature of the MZ interferometer may cause the null to drift, resulting in data transmission errors. The amount of drift is proportional to a difference in optical path lengths between the two arms. By matching the optical path lengths, however, the null in the transfer curve remains substantially fixed. Differences in temperature between the two arms can also result in optical path length differences. Other sources of stress to the waveguides can also cause optical path length differences. Thus, to the extent the temperature of an MZ modulator may change, such temperature changes, and corresponding thermally induced optical path length changes, should be the same for each arm so that the changes are "common-mode". Similarly, both arms should experience the same stress. When thermal or other stress to the waveguide arms is "common mode", variations in the phase and/or amplitude of an optical signal propagating in one arm cancel out such variations in an optical signal propagating in the other arm when the optical signals are combined at the output of the MZ interferometer.

Accordingly, there is a need to provide MZ modulators in which variations in temperature or stress are "common mode" and are substantially the same for both arms. Moreover, there is a need to increase the density of optical components integrated onto a PIC and for the MZ arms to have substantially the same length.

SUMMARY

Consistent with an aspect of the present disclosure, an apparatus is provided that includes a substrate and a Mach-Zehnder (MZ) interferometer provided on the substrate. The MZ interferometer has first and second arms, and the first arm has first, second, and third portions. The first and second portions of the first arm extend in first and second directions, respectively, and define a first acute inner angle. The third portion of the first arm extends in the first direction, such that the second and third portions of the first arm define a second acute inner angle. The first light propagates in the first portion of the first arm in the first direction, in the second portion of the first arm in the second direction, and the in the third portion of the first arm in the first direction. The second arm also has first, second, and third portions. The first and second portions of the second arm extend in third and fourth directions, respectively, and define a third acute inner angle. The third portion of the second arm extends in the third direction, such that the second and third portions of the second arm define a fourth acute inner angle. Second light propagates in the first portion of the second arm in the third direction, in the second portion of the second arm in the fourth direction, and the in the third portion of the second arm in the third direction.

Consistent with a further aspect of the present disclosure, the first and second directions are opposite one another. In addition, the third and fourth directions are the same as the first and second directions, respectively.

Consistent with an additional aspect of the present disclosure the first and second portions of the first arm of the MZ interferometer define a first angle that is between 90° and 270° and the second and third portions of the first arm define a second angle between −90° and −270°.

Moreover, consistent with an aspect of the present disclosure, the first and second arms have a serpentine shape.

In addition, consistent with the present disclosure, an apparatus is disclosed that comprises a Mach-Zehnder (MZ) interferometer having first and second arms. A first drive electrode is provided on a first portion of the first arm, and a second drive electrode is provided on a second portion of the first arm. The first and second drive electrodes are separated from one another by a gap over a third portion of the first arm. In addition, a third drive electrode is provided on the second arm, and a first contact electrode is included that provides a first voltage to the first and second drive electrodes. Further, a second contact electrode is included that provides a second voltage to the third drive electrode. A portion of the second contact electrode extends over the third portion of the first arm.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure.

BRIEF DESCRIPTION OF THE DRAWINGS

FIG. 8 illustrates an example of electrode wirings consistent with a further aspect of the present disclosure;

FIGS. 9a and 9b illustrate views taken along first and second cross-sections of the electrode wirings shown in FIG. 8; and FIG. 10 shows a perspective view of an electrode consistent with the present disclosure.

DESCRIPTION OF THE EMBODIMENTS

Consistent with the present disclosure, both arms of an MZ interferometer are "double-folded" and are bent in at least two locations to define a first and second acute inner angles. Accordingly, the arms of the MZ interferometer may have substantially the same path length, and, further, the MZ interferometer has a more compact geometry. In one example, the arms parallel each other and have a serpentine shape, and, in a further embodiment, the arms parallel one another and have a Z-shape. Optionally, the radius of curvature associated with each bend is enlarged to minimize loss and/or other distortions of an optical signal propagating through the arms. In addition, the spacing between the arms is relatively small and is typically less than or equal to 40 microns. Accordingly, since the temperature of a PIC upon which the MZ interferometer is provided does not vary significantly over such short distances, the temperatures of both arms is substantially the same. Thermal and mechanical stresses between the first and second arms of each MZ interferometer are common mode, and thus phase and amplitude variations associated with such stresses effectively cancel out.

Reference will now be made in detail to the present exemplary embodiments of the present disclosure, examples of which are illustrated in the accompanying drawings. Wherever possible, the same reference numbers will be used throughout the drawings to refer to the same or like parts.

Before describing MZ interferometers consistent with the present disclosure in greater detail, an exemplary optical communication system including transmitters that incorporate such MZ interferometers will first be described with reference to FIGS. 1-3.

Figure 1:
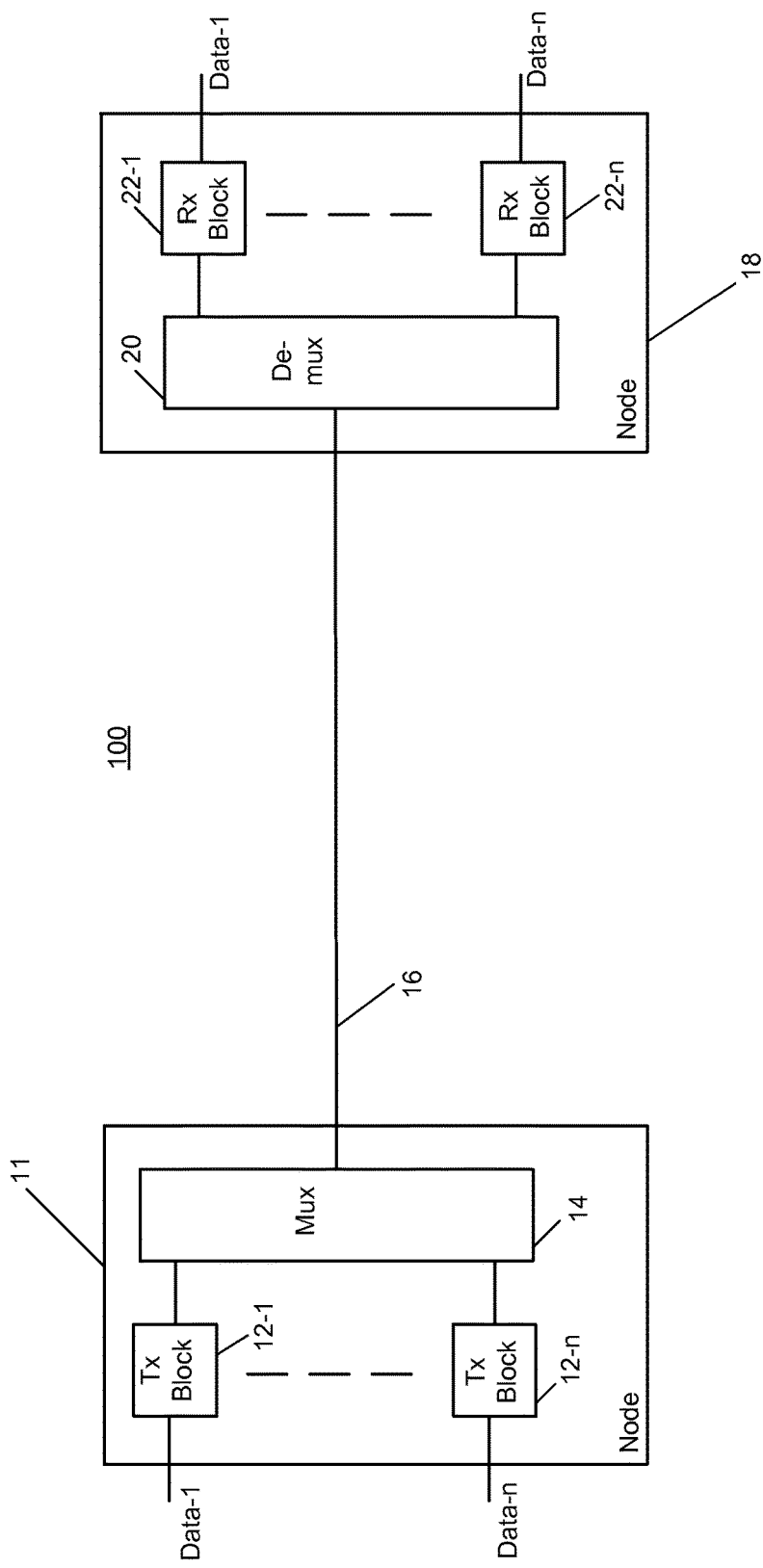
FIG. 1 illustrates a block diagram of an optical communication system consistent with the present disclosure.

FIG. 1 illustrates an optical link or optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams Data-1 to Data-n. Multiplexer 14, which may include one or more optical filters, for example, combines each of group of optical signals into a wavelength division multiplexed (WDM) that is output onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical decombiner or demultiplexer 20, which may include one or more optical filters. For example, optical demultiplexer 20 may supply each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n may have the same or similar structure and each of receiver blocks 22-1 to 22-n has the same or similar structure.

Figure 2:
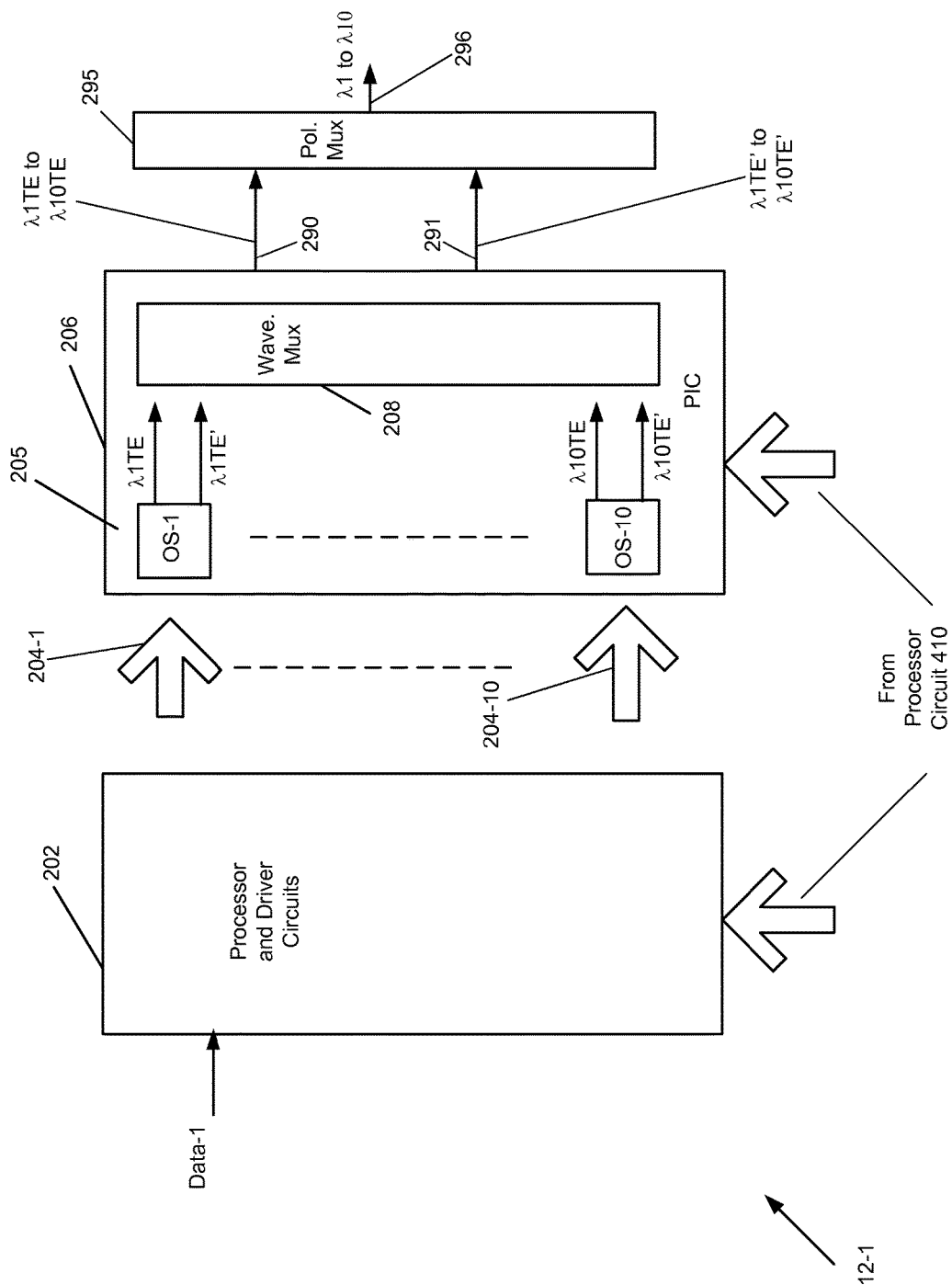
FIG. 2 illustrates a block diagram of an example of an optical transmitter block consistent with a further aspect of the present disclosure.

One of transmitter blocks 12-1 is shown in greater detail in FIG. 2. It is understood that remaining receiver circuitry or blocks 12-2 to 12-n have the same or similar structure as transmitter block 12-1. Transmitter block 12-1 may include a processor (such as a digital signal processor or DSP) and driver circuits 202, that receives, for example, a corresponding portion of Data-1. Circuitry 202, in turn, supplies corresponding outputs or electrical drive signal groupings 204-1 to 204-10 to optical sources or transmitter circuits OS-1 to OS-10 provided on transmit photonic integrated circuit (PIC) substrate 205.

As further shown in FIG. 2, each of optical sources OS-1 to Os-10 supplies a corresponding pair of modulated optical signals (for example, a respective one of pairs λ1TE, λ1TE' . . . λ10TE, λ10TE') to wavelength multiplexing circuitry 208. Typically, each optical signal within a given pair has the same or substantially the same wavelength, e.g., each of optical signals λ1TE, λ1TE' have wavelength λ1. In one example, each of optical signals λ1TE to λ10TE are multiplexed by wavelength multiplexing circuitry 208 into a first WDM output 290 and each of optical signals λ1TE' to λ10TE' are multiplexed into a second WDM output 291. Wavelength multiplexing circuitry 208 may include one or more arrayed waveguide gratings (AWGs) and/or one or more power combiners.

Optical sources OS-1 to Os-10 and wavelength multiplexing circuitry 208 may be provided on substrate 205, for example. Substrate 205 may include indium phosphide or other semiconductor materials, such as Group III-V semiconductor materials.

As further shown in FIG. 2, the first (290) and second (291) WDM outputs may be provided to polarization multiplexing circuitry 295, including, for example, a polarization beam combiner. In one example, first WDM output 290 may have a transverse electric (TE) polarization and is supplied to a polarization beam combiner by polarization maintaining optical fiber, such that the polarization of each optical signal in the first WDM output has the TE polarization upon input to polarization multiplexing circuitry 295. The second WDM output 291 may also have a TE polarization when output from wavelength multiplexer 208, but the second WDM output 291 may be provided to a second polarization maintaining fiber that is twisted in such a way that the polarization of each optical signal in the second WDM output 291 is rotated, for example, by 90 degrees. Accordingly, each such optical signal may have a transverse magnetic (TM) polarization when supplied to polarization multiplexing circuitry 295. Polarization multiplexing circuitry 295, in turn, combines the two WDM optical outputs to provide a polarization multiplexed WDM optical signal 296.

Although FIG. 2 illustrates ten optical sources OS1-1 to OS-10, it is understood that any appropriate number of such circuit blocks and optical sources may be provided. Moreover, it is understood, that optical sources OS-1 to OS-10, as well as wavelength multiplexing circuitry, wavelength multiplexer or wavelength combiner 208, may be provided as discrete components, as opposed to being integrated onto substrate 205, such as PIC 206. Alternatively, selected components may be provided on a first substrate while others may be provided on one or more additional substrates in a hybrid scheme in which the components are neither integrated onto one substrate nor provided as discrete devices.

Figure 3:
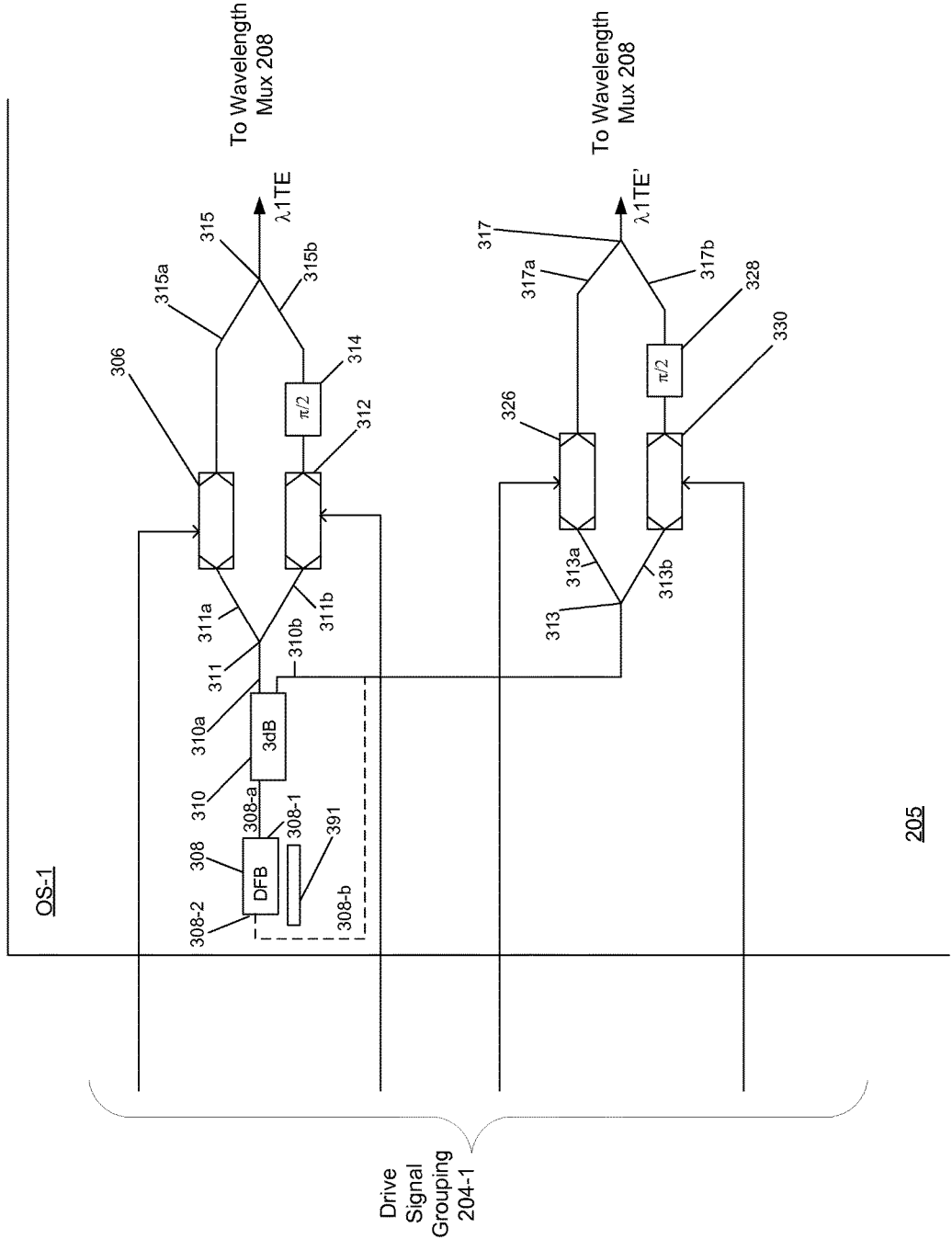
FIG. 3 illustrates a portion of the optical transmitter block show in FIG. 2 in greater detail.

FIG. 3 illustrates transmitter or optical source OS-1 in greater detail. It is understood that remaining optical sources OS-1 to OS-10 have the same or similar structure as optical source OS-1. It is understood that PICs and optical sources (OS) present in transmitter blocks 12-2 to 12-n operate in a similar fashion and include similar structure as PIC 206 and optical source Os-1 shown in FIGS. 2 and 3.

Optical source Os-1 may be provided on substrate 205 and may include a laser 308, such as a distributed feedback laser (DFB), which supplies light to at least four (4) modulators 306, 312, 326 and 330. Alternatively, other lasers may be provided. DFB 308 may output continuous wave (CW) light at wavelength λ1 to a dual output splitter or coupler 310 (e.g. a 3 db coupler) having an input port and first and second output ports. Typically, the waveguides used to connect the various components of optical source Os-1 may be polarization dependent. A first output 310a of coupler 310 supplies the CW light to first branching unit 311 (also referred to herein as "coupler 311") and the second output 310b supplies the CW light to second branching unit 313. A first output 311a of branching unit 311 is coupled to modulator 306 and a second output 311b is coupled or supplied to modulator 312. Similarly, first output 313a is coupled to modulator 326 and second output 313b is coupled to modulator 330. Modulators 306, 312, 326 and 330 may be, for example, Mach Zehnder (MZ) modulators or MZ interferometers. Each of the MZ modulators or interferometers receives CW light from DFB 308 and splits the light between two (2) arms or paths, as discussed in greater detail below with respect to FIGS. 4a, 4b, 5, and 6a-6c.

Laser 308 may be tunable or may be configured to provided optical signals having a substantially fixed wavelength.

Typically, an applied electric field in one or both paths or arms of a MZ interferometer may create a change in the refractive index within the arm(s). In one example, if the relative phase between the signals traveling through each path is 180° out of phase, destructive interference results and the signal is blocked. If the signals traveling through each path are in phase, the light may pass through the device and modulated with an associated data stream. The applied electric field, through application of biases or voltages at electrodes (not shown in FIG. 3, but illustrated in FIGS. 8, 9a, 9b, and 10) may also cause changes in the refractive index such that a phase, as well as the amplitude, of light output from the MZ modulator is shifted or changed relative to light input to the MZ modulator. Thus, appropriate changes in the electric field can cause changes in phase of the light output from the MZ modulator, such that the light output from the modulator complies with phase modulation format, such as QPSK, BPSK or another phase modulation format.

Each of the MZ interferometers 306, 312, 326 and 330 are driven with data signals or drive signals associated with drive signal grouping 204-1, for example. The CW light supplied to MZ modulator 306 via DFB 308 and coupler 311 is modulated in accordance with one such drive signal from grouping 204-1. The modulated optical signal from MZ modulator 306 is supplied to first input 315a of branching unit 315. Similarly, other drive signals of grouping 204-1 drive MZ interferometer 312. The CW light supplied to MZ modulator 312 via DFB 308 and coupler 311 is modulated in accordance with the drive signal supplied by driver circuit 328. The modulated optical signal output from MZ interferometer 312 is supplied to phase shifter 314 which shifts the phase of the signal 90° (π/2) to generate one of an in-phase (I) or quadrature (Q) components, which is supplied to second input 315b of coupler 315. The modulated data signals from MZ interferometer 306, which includes the other of the I and Q components, and from MZ interferometer 312 are supplied as optical signal λ1TE (see FIG. 2) to wavelength multiplexing circuitry 208 via coupler 315.

Further drive signals of grouping 204-1 drive MZ interferometer 326 to output modulated optical signals as one of the I and Q components. The CW light supplied from DFB 308 is supplied to MZ interferometer 326 via first output 313a of coupler 313. MZ interferometer 326 then modulates the CW light supplied by DFB 308, in accordance with drive signals from driver circuit 202. The modulated optical signal from MZ modulator 326 is supplied to first input 317a of coupler 317.

An additional drive signal of grouping 204-1 drives MZ modulator 330. CW light supplied from DFB 308 is supplied to MZ modulator 330 via second output 313b of coupler 313. MZ modulator 330 then modulates the received optical signal in accordance with the drive signal supplied by driver 332. The modulated data signal from MZ modulator 330 is supplied to phase shifter or rotator 328 which shifts the phase the incoming signal 90° (π/2) and supplies the other of the I and Q components to second input 317b of coupler 317.

The modulated data signal from MZ modulator 330 is also supplied to branching unit 317, and the combined outputs from MZ modulators 326 and 330 are also supplied to wavelength multiplexing circuitry 208 as optical signal λ1TE' Both λ1TE and λ1TE' have a TE polarization, but λ1TE', as well as λ2TE' to λ10TE' as part of the second WDM optical output 291 may be polarization rotated to have a TM polarization (to provide optical signals λ1TM to λ10TM) prior to be polarization multiplexed in circuitry 295 (see FIG. 2 above).

MZ interferometers 306, 312, 326, and 330 may have a traveling wave or lumped configuration.

As noted above, one DFB laser 108 may provide a CW signal to four separate MZ modulators or interferometers 306, 312, 326 and 330 for modulating at least four separate optical channels by utilizing phase shifting and polarization rotation of the transmission signals. Alternatively, multiple CW light sources may be used for each channel which increased device complexity, chip real estate, power requirements and associated manufacturing costs.

Alternatively, splitter or coupler 310 may be omitted and DFB 308 may be configured as a dual output laser source to provide CW light to each of the MZ interferometers 306, 312, 326 and 330 via couplers 311 and 313. In particular, coupler 310 may be replaced by DFB 308 configured as a back facet output device. Both outputs of DFB laser 308, from respective sides 308-1 and 308-2 of DFB 308, are used, in this example, to realize a dual output signal source. A first output 308a of DFB 308 supplies CW light to coupler 311 connected to MZ interferometers 306 and 312. The back facet (side 308-2) provides second CW output 308b of DFB 308 to coupler 313 via path or waveguide 343 (represented as a dashed line in FIG. 3). The dual output configuration may provide sufficient power to the respective MZ interferometers with less power than that experienced through 3 dB coupler 310.

Figure 4A:
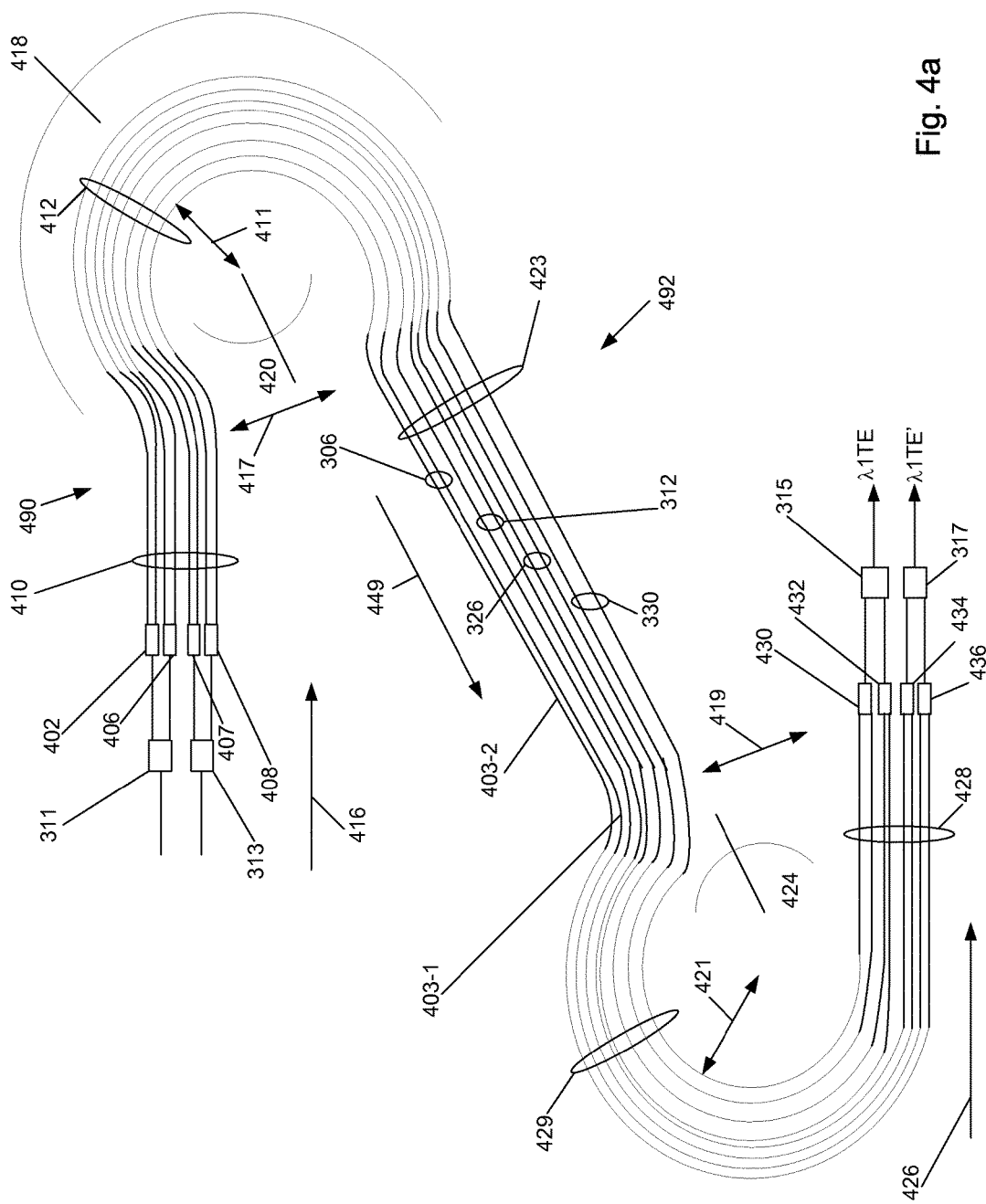
FIGS. 4a and 4b, 5, and 6a-6d illustrate exemplary layouts consistent aspects of the present disclosure.

Collectively, MZ interferometers or modulators 306 and 312 constitute a first "super MZ" (designated by reference character 490 in FIG. 4*a*) and MZ interferometers 326 and 330 constitute a second super MZ (designated by reference character 492 in FIG. 4*a*). FIG. 4*a* illustrates an example of a layout or geometry 400 of the first (490) and second (492) super MZs consistent with an aspect of the present disclosure.

Super MZ 490, which is provided on substrate 205, includes coupler 311, which, as noted above, has an input that receives light from either side 308-1 of DFB laser 308 or from output 310*a* of 3 dB coupler 310. Coupler 311 may include a multi-mode interference (MMI) coupler or a Y-coupler, and has first and second outputs that supply a first part or portion of the received light to coupler 402 of MZ interferometer 306 and a second part or portion to coupler 406 of MZ interferometer 312. Further, coupler 313, which may also include either an MMI coupler or a Y-coupler, receives light from either the other side 308-2 of DFB laser 308 or from output 310*b* of 3 db coupler 310. A first part or portion of such light is supplied to coupler 407 of MZ interferometer 326 and a second part or portion of such light is supplied to coupler 408 of MZ interferometer 330. MZ interferometer 306 has a pair of arms or waveguides that extend between couplers 402 and 430; MZ interferometer 312 has a pair of arms that extend between couplers 406 and 432; MZ interferometer 326 has a pair of arms that extend between couplers 407 and 434; and MZ interferometer 330 has a pair of arms that extend between couplers 408 and 436 (first and second arms or arm waveguides). Typically, light supplied from outputs 310-*a* and 310-*b* has the same wavelength.

Each arm of each pair has a first portion (collectively, the first portions of the arms are designated by reference character 410 in FIG. 4*a*) that extends in a corresponding direction, and each such direction is collectively represented by arrow 416. Each arm of each pair also has a first bent or curved portion (collectively, 412) and the first curved portion of each arm has an associated first radius of curvature (ROC). Collectively, the first ROCS are represented by reference character 411. Arms or waveguides 403-1 and 403-2 are two arms that constitute an arm pair of MZ interferometer 306 and are similar in structure to the other arms included in MZ interferometers 312, 326, and 330.

Each arm of each pair has a second (central, middle) portion (collectively, 423) that extends in a corresponding direction, and each such direction is collectively represented by arrow 449. Moreover, each arm of each pair has a second bent or curved portion (collectively, 429), which has an associated second ROC. Collectively, the second ROCS are represented by reference character 421. As further shown in FIG. 4*a*, each arm has a third portion (collectively, 428) that extends in a corresponding one of a plurality of directions collectively represented by arrow 426. The third arm portions feed light or optical signals to one of couplers 430 and 432 of MZ interferometers 306 and 312, respectively, and couplers 434 and 436 of MZ interferometers 326 and 330, respectively. Couplers 430 and 432 supply first and second modulated outputs, respectively, to coupler 315, and couplers 434 and 436 supply third and fourth modulated outputs, respectively, to coupler 317. As noted above, couplers 315 and 316 output modulated optical signals λ1TE and λ1TE', respectively. Each of couplers 430, 432, 434, 436, 315, and 317 may include either an MMI coupler or a Y-coupler.

In one example, each of the first arm portions 410 extend in the same direction (i.e., a first direction), each of the second arm portions 423 extend in the same direction (i.e., a second direction) and each of the third arm portions 428 extend in the first direction. The first direction may be opposite the second direction.

The first and second portions of a given arm also define a first acute inner angle. Collectively, such first acute inner angles are represented by reference character 420. The first acute inner angles 420 may also be defined by bent portions 412. In addition, the second and third portions of a given arm define a second acute inner angle, and, collectively, such first acute inner angles are represented by reference character 424. Bent portions 429 may also define inner acute angles 421. Outer angle 418 is further shown in FIG. 4*a*. Second inner acute angles 421 are rotated in an opposite direction (e.g., an angular direction) relative to first inner acute angles 420. For example, as shown in FIG. 4*a*, such rotation may be either clockwise or counterclockwise.

Consistent with a further aspect of the present disclosure, FIG. 4*a* shows a distance 417 between part of the first portion of a given arm and a part of the second portion of a given arm. Preferably, distance 417 is less than ROC 411, and, in one example, ROC 411 is at least equal to twice distance 417. Similarly, distance 419 between parts of the second and third portions of a given arm is less than ROC 421, and in a further example, ROC 421 is at least equal to twice distance 419. With such ROCs, optical signal distortions (e.g., spurious changes in phase and/or amplitude) are minimized as the optical signal or light propagates through each bent or curved portion.

As noted above, by providing a double folded structure or geometry, e.g., each arm has at least two bent or curved portions, the length of each arm can be made substantially the same. Moreover, the arms can be fabricated to be relatively close to one another by a distance that is 40 microns or less. Thus, since the arms are relatively close to one another, any change of temperature in one arm or portion thereof will be the same or substantially the same as any change in temperature of the other arm. The arms may also be readily maintained at the same or substantially the same temperature. Accordingly, the temperature changes are "common mode" and be readily corrected.

Figure 4B:
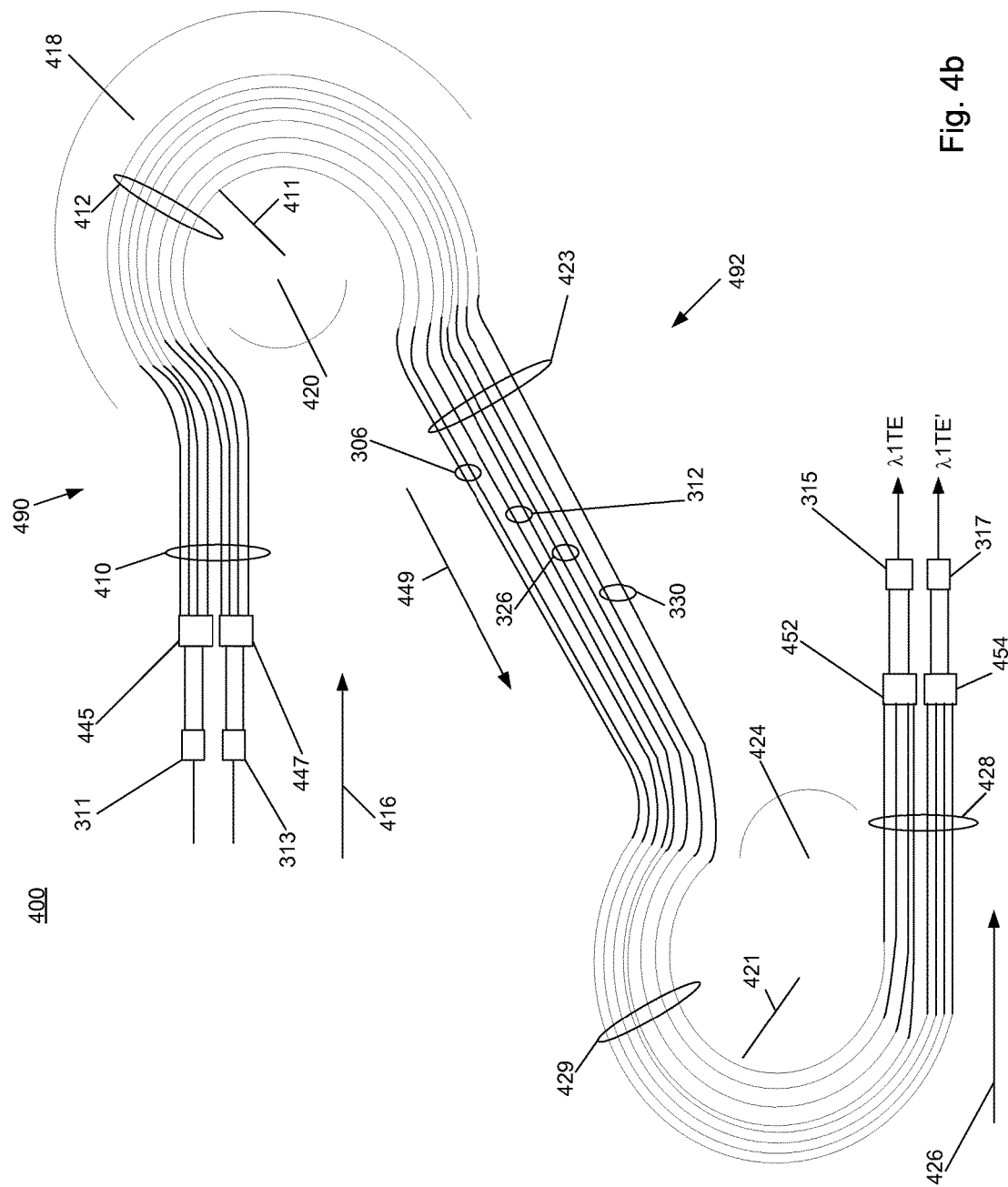

The example shown in FIG. 4*b* is similar to that shown in FIG. 4*a*, except couplers 402 and 406 are replaced by 2×4 MMI coupler 445; couplers 407 and 408 are replaced by 2×4 MMI coupler 447; couplers 430 and 432 are replaced by 2×4 MMI coupler 452; and couplers 434 and 436 are replaced by 2×4 MMI coupler 454. Accordingly, in the resulting layout in the example shown in FIG. 4*b*, may have a more compact design.

FIGS. 4*a* and 4*b* show arms having a Z-shape, but other waveguide arm shapes or layouts are contemplated by the present disclosure.

Figure 5:
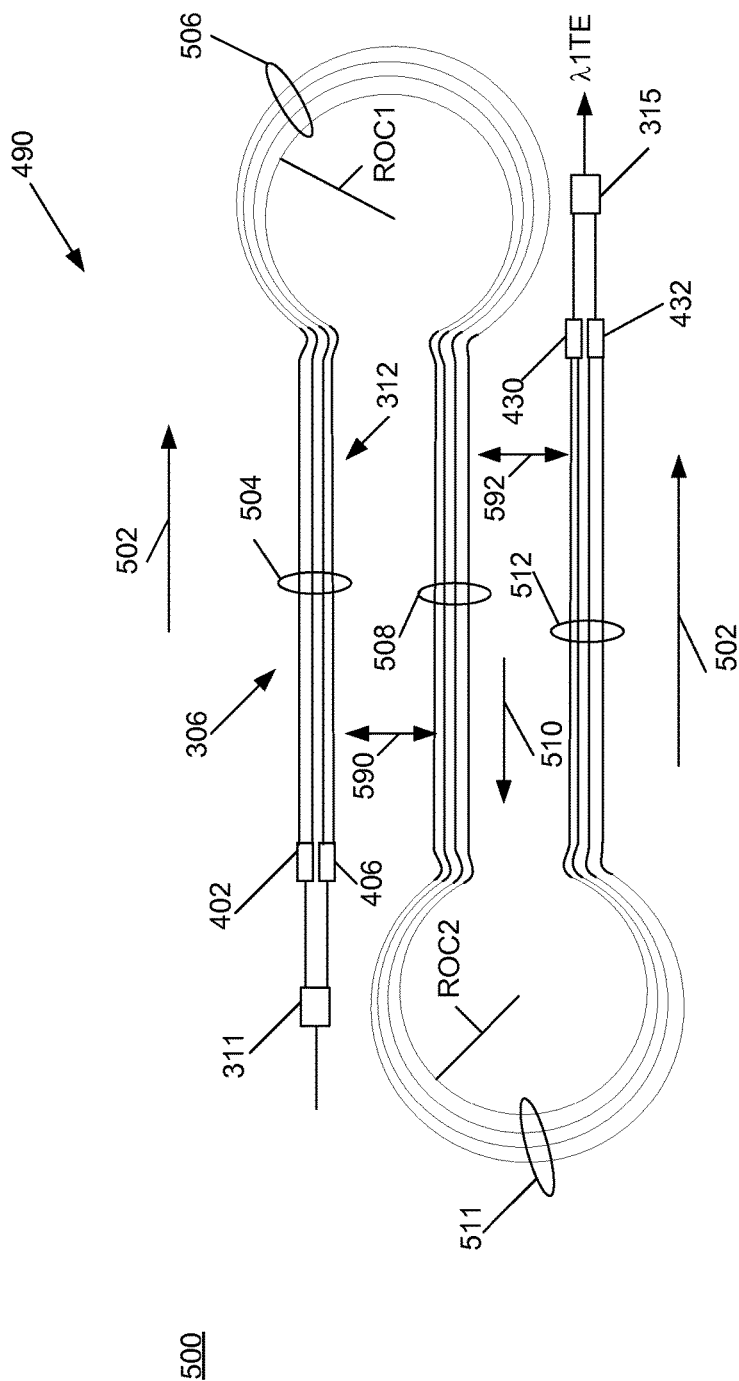

For example, FIG. 5 illustrates layout or geometry 500 consistent with a further aspect of the present disclosure. Here, super MZs 490 has a "hairpin" configuration, whereby arm segments are folded to extend parallel to one another. In layout 500, curved portions are also provided as in FIGS. 4*a* and 4*b*, and such curved portions may also have a relatively large radius of curvature that is greater than the spacing between the segments. In each of the exemplary layouts or geometries described herein, it is understood that super MZ 492 may have the same or similar structure as super MZ 490.

It is understood that super MZ 492 may have the same or similar structure

As shown in FIG. 5, each of first portions of the arms of MZ interferometers 306 and 312 (collectively designated by reference character 504) may extend in a first direction 502.

The arms may also have first curved portions 506, each having a corresponding one of a plurality of radii of curvature (collectively represented by ROC1), such that second portions (collectively, 508) extend from the curved portions in a second direction (arrow 510) that is opposite or substantially opposite direction 502. The arms also have second curved portions 511 having corresponding radii of curvature collectively represented by reference character ROC2. The arms further include third portions 512 that extend in first direction 502 in the first direction.

Preferably, ROC1 and ROC2 exceed the distance or spacing 590 between first portions 504 and second portions 508, as well as distance or spacing 592 between second portions 508 and third portions 512. In one example, ROC1 and/or ROC2 are at least twice such spacings. ROC1 may be less than or greater than RCO2. In addition, the waveguide arms may be configured as S-bends between portions 504 and 508 and 512.

The layout shown in FIG. 5 also achieves uniform arm lengths and reduced temperature variation between MZ arms in a manner similar to that described above.

Figure 6A:
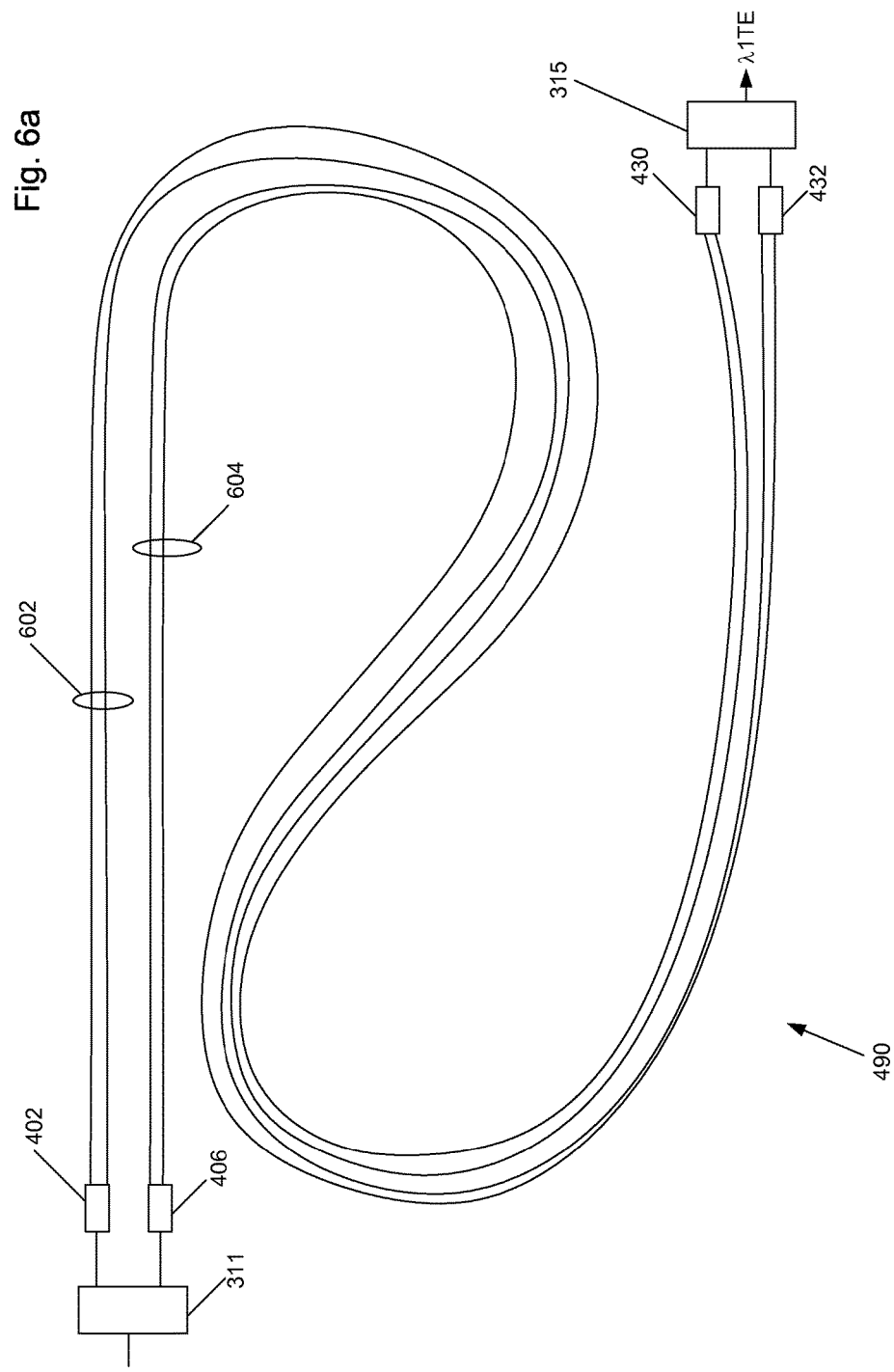

FIG. 6a illustrates an exemplary layout or geometry of super MZ 490. In FIG. 6a, MZ arm pair 602 associated with MZ interferometer 306, for example, has a serpentine or "S" shape. MZ arm pair 604 may have a similar shape and extend parallel to arm pair 602.

Figure 6B:
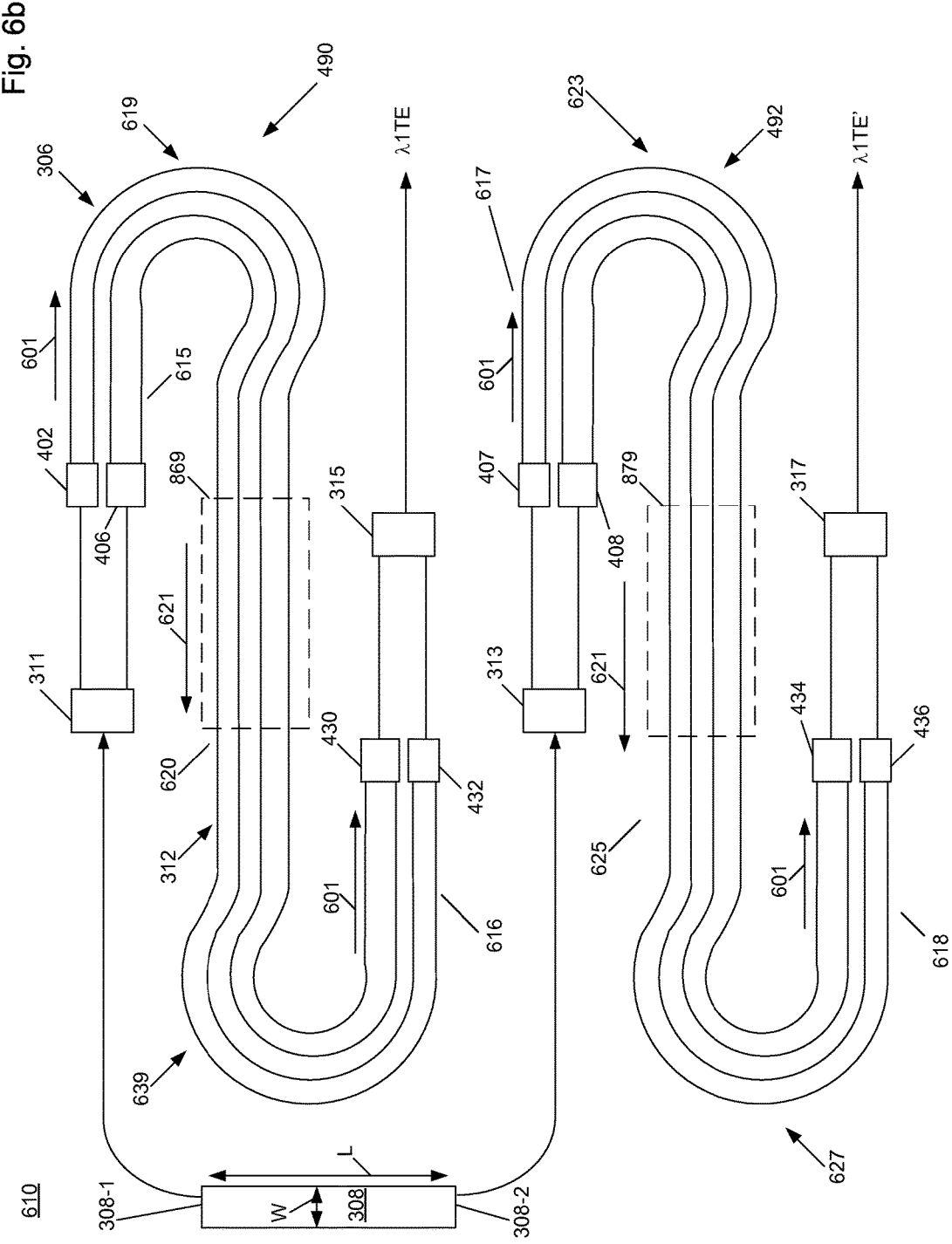
Figure 6C:
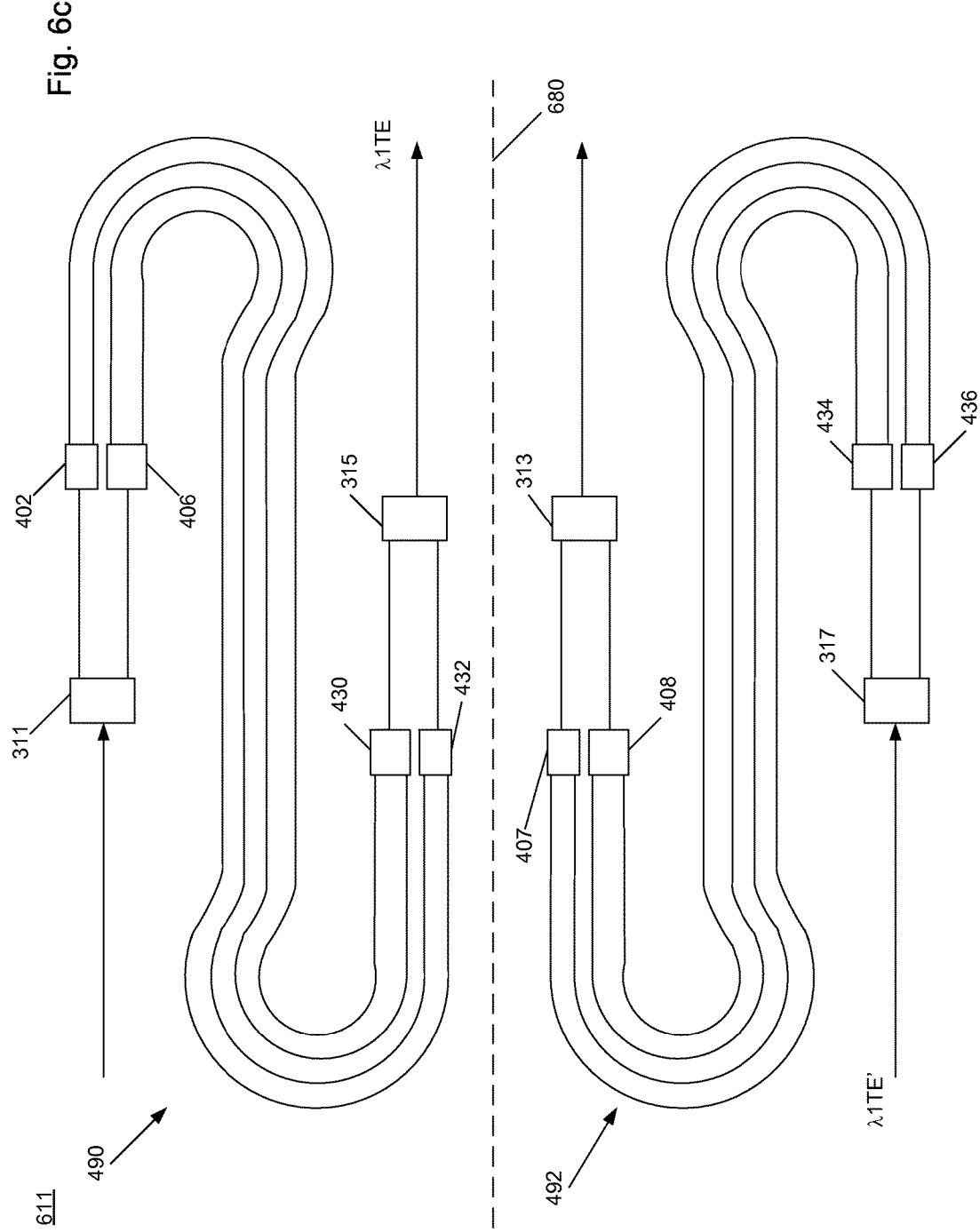

FIGS. 6b and 6c illustrate additional exemplary geometries 611 and 612 of super MZs 490 and 492. In FIG. 6b, the waveguide pairs of super MZ 490 extending between couplers 402 and 430 and waveguide pairs or arms extending between couplers 406 and 432 have straight portions 615 and 616. Similarly, the waveguide pairs or arms of super MZ 492 extending between couplers 407 and 434 and waveguide pairs extending between couplers 408 and 436 have straight portions 617 and 618. Super MZ 490 includes straight portions 615 (portions 617 of super MZ 492) having lengths that extend in first directions 601, bent portions 619 (portions 623 of super MZ 492), middle or central portions 620 (625 of super MZ 492) that extend in second directions 621, additional bent portions 639 (627 of super MZ 492), and further straight portions 616 (618 of super MZ 492) that extend in first direction 601. It is noted, however, that the directions in which portions 615 (617) and 616 (618) extend may be different from one another.

In the example shown in FIG. 6b, MZ interferometer 306 includes couplers 402 and 430 and the waveguide pair or arms extending therebetween. MZ interferometer 312 includes couplers 406 and 432 and the waveguide pair or arms extending therebetween.

In addition, FIG. 6b illustrates an exemplary configuration of laser 308 relative to the waveguide pairs. In particular, laser 308 may have a length L that is greater than a width W. Length L may extend in a direction that is perpendicular or substantially perpendicular to directions 601 and/or 621.

The electrode configurations within the central portions (e.g., 620, 625) of the waveguide pairs designated by reference characters 869 and 879 are discussed in greater detail below with reference to FIG. 8.

In operation, light output from side 308-1, for example, of laser 308 is supplied to coupler 311, where it is split and a first portion of the light is supplied to coupler 402 and a second portion is supplied to coupler 406. Coupler 402, in turn, supplies a third portion of the light to a first arm and a fourth portion of the light to a second arm of MZ interferometer 306. In addition, coupler 406 supplies a fifth portion of the light to a first arm of MZ interferometer 312 and a sixth portion of the light to a second arm of MZ interferometer 312. The third, fourth, fifth, and sixth portions of the light travel along corresponding waveguide arms and through the straight and bent portions discussed above. Appropriate biases may be applied to electrode configurations 869 and 879 to adjust or modulate the phase and or amplitude of such light portions. For example, the phase and/or amplitude of the third and fourth portions of the light may be modulated in accordance with an in-phase (I) component signal, and the fifth and sixth portions of the light may be modulated in accordance with a quadrature (Q) component signal.

The third and fourth light portions may be combined by coupler 430, and the fifth and sixth light portions may be combined by coupler 432, and the modulated outputs of couplers 430 and 432 (i.e., the modulated optical signal outputs from MZ interferometers 306 and 312) are combined by coupler 315 to supply λ1TE. Light output from side 308-2 of laser 308 may similarly be supplied to super MZ interferometer 492, split in to portions, phase and/or modulated, and such portions may be combined to output λ1TE (see FIG. 3). Light output from sides 308-1 and 308-s typically has the same wavelength.

In an alternative embodiment, light is supplied to super MZ interferometers 490 and 492 from outputs 310a and 310b of 3 dB coupler 310 (see FIG. 3).

FIG. 6c illustrates a configuration of super MZs 490 and 492 which is similar to that shown in FIG. 6b. In FIG. 6c, the orientation of MZ 492 is a mirror image of the configuration of MZ 490 about line 680.

It is understood that each of the above-noted configurations may be provided in each of optical sources OS-2 to OS-10, for example, to generate modulated optical outputs or optical signals λ2TE to λ10TE and λ2TE' to λ10TE'. In addition, in each of the above examples, the MMI couplers (e.g., 430, 432, etc.) may be provided at any appropriate location along the waveguide arms.

Figure 6D:
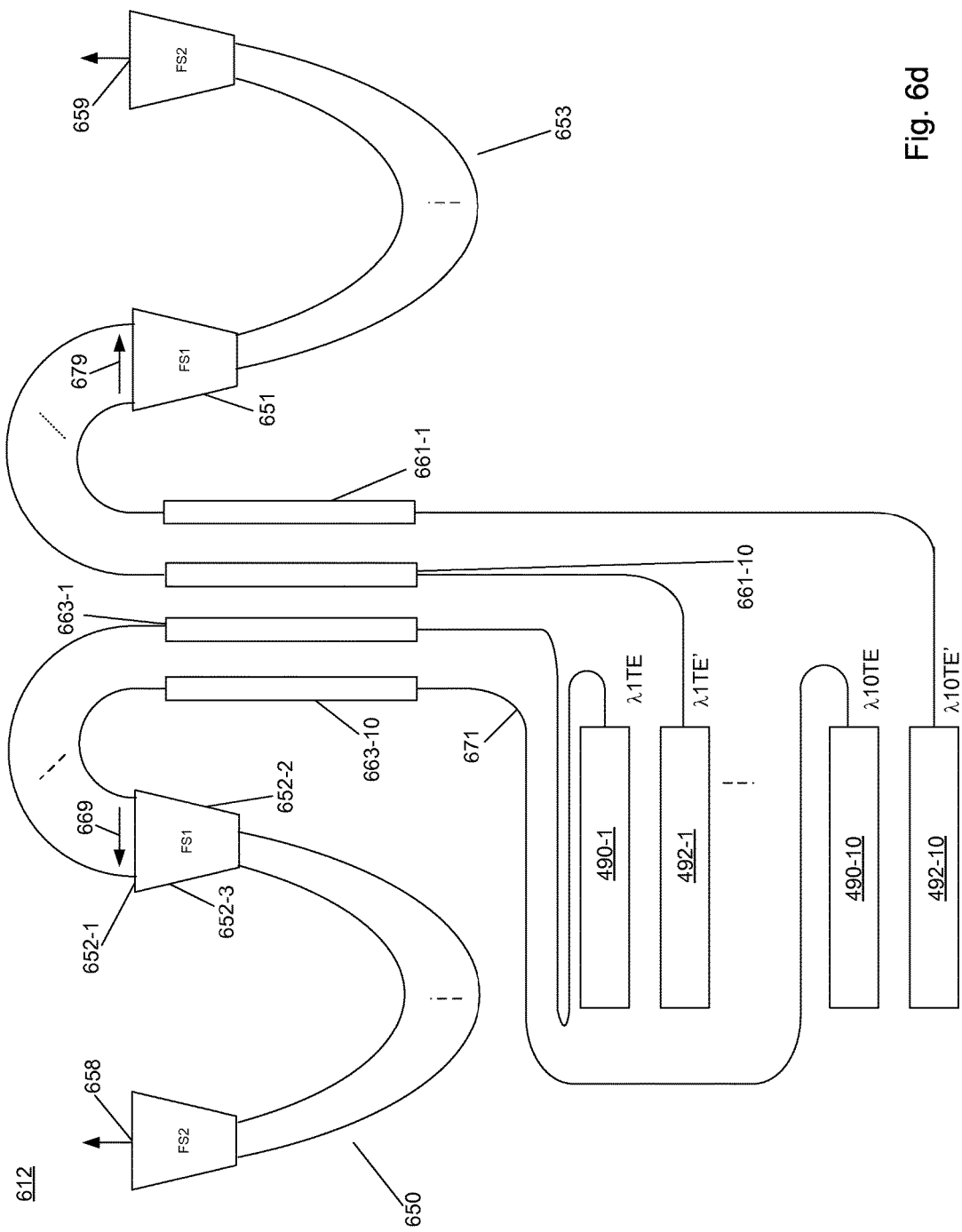

FIG. 6d shows another configuration 612 in which the outputs of super MZs 490-1 and 492-1 (corresponding to super MZs 490 and 492, respectively) are supplied to and multiplexed by respective arrayed waveguide gratings (AWGs) 650 and 652 prior to polarization combining by polarization multiplexer 295 (see FIG. 2). Additional super MZs 490-2 to 490-10 supply each of a respective one of optical signals λ2TE to λ10TE and super MZs 492-2 to 492-10 supply each of a respective one of optical signals λ2TE' to λ10TE'. Preferably, a modulated output or optical signal supplied from each of super MZs 490-1 to 490-10 is fed to a respective one of variable optical attenuators (VOAs) 663-1 to 663-10. Each VOA 663-1 to 663-10 may include a biased electrode that is provided along a substantial portion of a corresponding input waveguide (e.g., waveguide 670) that extends from each super MZ to free space region FS1 of AWG 650. Typically, the end portions of the input waveguides are positioned along free space region edge 652-1 to supply optical signals having wavelengths that increase in a direction indicated by arrow 669. Thus, for example, optical signals having the smallest wavelength λ1 (e.g., λ1TE) are supplied nearest edge 652-2 of free space region FS1 of AWG 650, and optical signals having the greatest wavelength λ10 (e.g., λ10TE) are supplied nearest the innermost edge 652-3 of free space region FS1 of AWG 650.

Similarly, the outputs of super MZ 492-1 to 492-10 may be provided to free space region FS1 of AWG 653 via a corresponding one of VOAs 661-1 to 661-10. The optical signals are preferably supplied to free space region FS1, such that the wavelength of each optical signal increases in a direction indicated by arrow 679.

As further shown in FIG. 6d, optical signals input to FS1 of AWG 650 may be combined and output on output waveguide 658 extending from free space region of AWG 650. In addition, optical signals input to free space region FS of AWG 652 may be combined and output on output waveguide 659 of AWG 652.

Figure 7A:
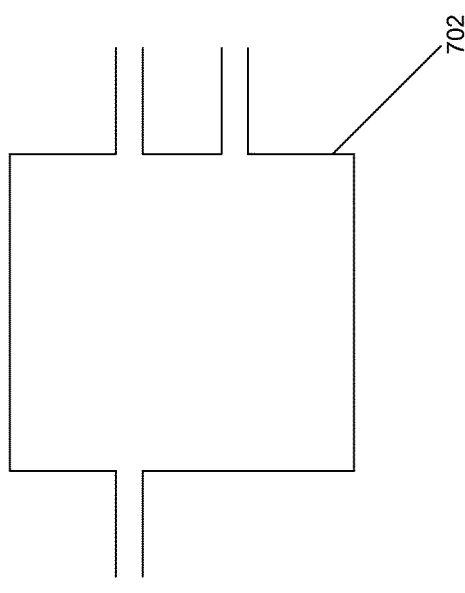
FIG. 7a illustrates a block diagram of an multi-mode interference coupler consistent with an aspect of the present disclosure.
Figure 7B:
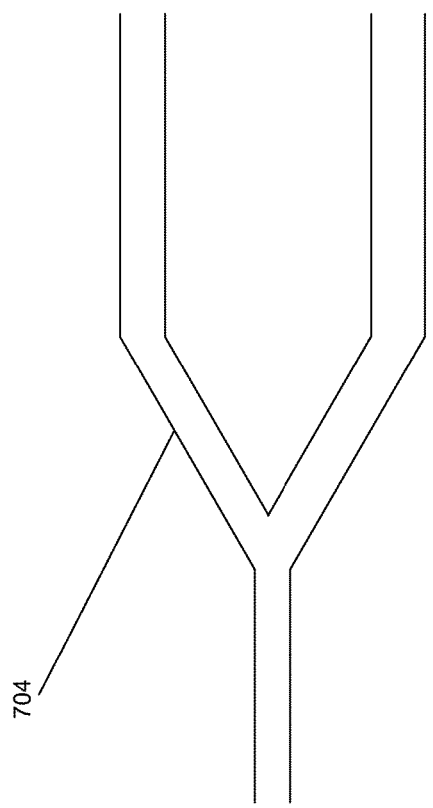
FIG. 7b illustrates a Y-coupler consistent with an additional aspect of the present disclosure.

FIGS. 7a and 7b illustrate examples of couplers that may be implemented in accordance with an aspect of the present disclosure. FIG. 7a shows an example of an MMI coupler 702, and FIG. 7b illustrates an example of a Y-coupler. It is understood that the couplers discussed above may include either MMI couplers or Y couplers or combinations of the two. Alternatively, other known couplers may be provided.

As noted above in regard to FIG. 3, electrodes, e.g., drive electrodes, may be provided to apply a bias or voltage (drive signals) near or on one of the arms of the MZ interferometer in order to generate an electric field in the arm to change the refractive index of the arm. Such refractive index changes may result in a change of amplitude and/or phase of propagating in that arm. FIG. 8 illustrates exemplary wiring configurations 869 and 879 consistent with the present disclosure that provide a simple and efficient electrical connection to the electrodes overlying the waveguide arms. In one embodiment, wiring configuration 869 may be provided to supply appropriate drive signals to central portions of the arms of MZ modulator 306 (see FIG. 3) between curved or bent waveguide portions discussed above, and wiring configuration 879 may be provided to supply appropriate drive signals to central portions of the arms of MZ modulator 312, also between such curved or bent waveguide portions.

FIGS. 9a and 9b illustrate cross-sections of wiring configuration 869 taken along lines 9a-9a and 9b-9b, respectively, in FIG. 8a. The following description of electrode configuration 800 will be made with reference to FIGS. 8, 9a, and 9b. FIGS. 8, 9a, and 9b illustrate a lumped electrode configuration. Consistent with the present disclosure, however, a traveling wave electrode configuration may also be provided.

Wiring configuration 869 includes a first drive electrode 808 provided on a first portion of first MZ arm 812 of a first MZ interferometer, and a second drive electrode 816 provided on a second portion of first MZ arm 812. The first (808) and second (816) drive electrodes are separated from one another by a gap 823 over a third portion of first MZ arm 812. Third drive electrode 818 is provided on second MZ arm 904 of the first MZ interferometer.

As further shown in FIG. 8, first contact electrode 802 provides a first voltage to first drive electrode 808 and an additional contact electrode 814 provides the first voltage to second drive electrode 816. Conductor 804 may be provided to electrically connect contact electrodes 802 and 814 to one another. Alternatively, one U-shaped or V-shaped contact electrode may be provided to supply a common bias or voltage to the first (808) and second (816) drive electrodes.

In addition, contact electrode 810 may extend over the portion of first arm 812 underlying gap 823. Contact electrode 810 is preferably configured to supply a voltage or bias to third drive electrode 818 overlying second arm 904.

As shown in FIG. 9a, insulator layer 902 may be provided in gap 823 between first arm 812 and contact electrode 810. Alternatively, insulator layer 902 may be omitted and gap 823 may extend between first arm 812 and contact electrode 810. Insulator 902 may include a known dielectric, for example.

The above described electrodes may be provided to generate appropriate electric fields in the arms of one MZ interferometer (e.g. MZ interferometer 306) of a super MZ (e.g., super MZ 490). As further shown in FIG. 8, additional electrodes 830, 832, 834, 836, 838 (on the first MZ arm 812-2 of the second MZ interferometer), 844, 846, and 848 (on the second MZ arm 904-2 of the second MZ interferometer) may be similarly configured to generate appropriate electric files in the arms of a second MZ interferometer (e.g., MZ interferometer 312) of the super MZ (e.g., super MZ 490). Electrodes 830, 832, 834, 836, 838 on, 844, 846, and 848, however, are provided as a mirror image of 802, 804, 806, 808, 810, 814, 816, and 818. Accordingly, the electrodes may be provided relatively close to and parallel to one another, and the underlying waveguide arms may also be provided close to and parallel to one another, e.g., the waveguides may be separated by 40 microns or less, as noted above.

Each electrode may include a known metal or other suitable conductor. Alternatively, electrodes 816 and 818 may be made of semiconductor material. In addition, each electrode is preferably electrically isolated from one another, for example, by trenches. FIG. 10 illustrates an exemplary waveguide 1010 having such isolation consistent with the present disclosure.

Waveguide 1010, which may correspond to one of the waveguide arms discussed above, may include successively deposited semiconductor layers 1022, 2020, and 1018. In one example, semiconductor layer 1022 has an n conductivity type, semiconductor layer 1020 is intrinsic, and semiconductor layer 1018 has a p conductivity type. It is understood, however, that layers 1018 and 1022 may have opposite conductivity types. A first electrode, such as a drive electrode 1012 may be provided overlying waveguide portion 1010-a and a second electrode, such as drive electrode 1014, may be provided over waveguide portion or section 1010-b. Preferably, in order to provide substantial electrical isolation between electrodes 1012 and 1014 a trench or groove 1016 is provided between electrodes 1012 and 1014 that extends through a portion of layer 1018.

Returning to FIG. 8, electrodes 808 and 818 may be driven by known "push-pull" electrical drive signals in order to minimize cross-talk between the electrodes. Electrodes 838 and 848 may similarly be driven in a push-pull fashion.

Other embodiments will be apparent to those skilled in the art from consideration of the specification. For example, as noted above with reference to FIG. 6b, electrodes may be provided over central portions of the MZ interferometer arms (e.g., waveguide arms or pairs associated with MZ interferometer 306) in order to modulate the amplitude and/or phase of the light passing through MZ interferometer 306. Consistent with a further aspect of the present disclosure, however, such electrodes may alternatively, or in addition, be provided over waveguide portions 615 or waveguide portion 616, which are closer to an input side or outputs side of MZ interferometer 306, respectively.

Moreover, as noted above, VOAs, consistent with the present disclosure, may be realized by providing an electrode over a waveguide and supplying a relatively slowly varying or DC voltage or bias to such electrodes. Such electrode/waveguide structures are discussed above in connection with FIG. 10. Phase and amplitude modulators may also be realized with by providing an electrode having an appropriate length on a waveguide and appropriately biasing the electrode, with a higher frequency voltage signal, for example. It is understood, that such VOAs, amplitude modulators and/or phase modulators may be provided in any of the above noted sections or portions of the waveguide arms of the above-described MZ interferometers (e.g., portions 615, 620, and 618 of MZ interferometer 306).

In addition, couplers 402 and 406 may be provided in the central portions of each of the waveguide arms of the above-described MZ interferometers, e.g., section 620 of the waveguide arms associated with MZ interferometer 306.

Further, instead of bent portions, a photonic bandgap material may be provided to bend light in the each arm. For example, a turning mirror may be provided.

It is intended that the specification and examples be considered as exemplary only, with a true scope and spirit of the invention being indicated by the following claims.

What is claimed is:

1. An apparatus, comprising:
   a substrate;
   a Mach-Zehnder (MZ) interferometer provided on the substrate, the MZ interferometer having first and second arms,
   the first arm having first, second, and third portions, the first and second portions of the first arm extending in first and second directions, respectively, and defining a first acute inner angle, the third portion of the first arm extending in the first direction, such that the second and third portions of the first arm define a second acute inner angle, wherein first light propagates in the first portion of the first arm in the first direction, in the second portion of the first arm in the second direction, and the in the third portion of the first arm in the first direction, and
   the second arm having first, second, and third portions, the first and second portions of the second arm extending in third and fourth directions, respectively, and defining a third acute inner angle, the third portion of the second arm extending in the third direction, such that the second and third portions of the second arm define a fourth acute inner angle, wherein second light propagates in the first portion of the second arm in the third direction, in the second portion of the second arm in the fourth direction, and in the third portion of the second arm in the third direction, the first and second arms being spaced from one another by a distance that is 40 microns or less, such that a temperature of the first arm is substantially the same as a temperature of the second arm during operation of the MZ interferometer in which the MZ interferometer outputs a modulated optical signal, the first and second portions of the second arm are provided between the first and second portions of the first arm; and
   an electrode that is provided on one of the first and second arms, such that, in response to changes in an electrical signal supplied to the electrode, an electric field is generated in said one of the first and second arms that changes a refractive index in said one of the first and second arms.

2. An apparatus in accordance with claim 1, wherein the MZ interferometer includes a first and second couplers, first and second ends of the first arm being provided adjacent the first and second couplers, respectively, and first and second ends of the second arm being provided adjacent the first and second couplers, respectively, a length of the first arm from the first end to the second end being substantially the same as a length of the second arm from the first end to the second end.

3. An apparatus in accordance with claim 1, wherein the first direction is substantially the same as the third direction and the second direction is substantially the same as the fourth direction.

4. An apparatus in accordance with claim 3, wherein the first direction is opposite the second direction.

5. An apparatus in accordance with claim 1, further comprising a laser that provides an optical signal to the Mach-Zehnder interferometer, the first light constituting a first portion of the optical signal and the second light constituting a second portion of the optical signal.

6. An apparatus in accordance with claim 5, wherein the laser is provided on the substrate, the laser having a width and a length which is greater than the width, the length of the laser extending in a direction that is substantially perpendicular to at least one of the first and second directions.

7. An apparatus in accordance with claim 1, wherein the first arm includes a curved portion between the first and second portions of the first arm, part of the first portion of the first arm being spaced by part of the second portion of the first arm by a first distance, the curved portion having an associated radius of curvature equal to a second distance, the second distance being at least twice the first distance.

8. An apparatus in accordance with claim 1, wherein the MZ interferometer includes first and second MMI couplers, the first and second arms extending between the first and second MMI couplers.

9. An apparatus, comprising:
   a substrate;
   a Mach-Zehnder (MZ) interferometer provided on the substrate, the MZ interferometer having first and second arms, the first arm having first, second, and third portions, the first and second portions of the first arm extending in first and second directions, respectively, and defining a first angle that is between 90° and 270°, the third portion of the first arm extending in the first direction, such that the second and third portions of the first arm define a second angle between −90° and −270°, wherein first light propagates in the first portion of the first arm in the first direction, in the second portion of the first arm in the second direction, and the in the third portion of the first arm in the first direction, and
   the second arm having first, second, and third portions, the first and second portions of the second arm extending in third and fourth directions, respectively, and defining a third angle between 90° and 270°, the third portion of the second arm extending in the third direction, such that the second and third portions of the second arm define a fourth angle between −90° and −270°, wherein second light propagates in the first portion of the second arm in the third direction, in the second portion of the second arm in the fourth direction, and the in the third portion of the second arm in the third direction, the first and second arms being spaced from one another by a distance that is 40 microns or less, such that a temperature of the first arm is substantially the same as a temperature of the second arm during operation of the MZ interferometer in which the MZ interferometer outputs a modulated optical signal, the first and second portions of the second arm are provided between the first and second portions of the first arm; and
   an electrode that is provided on one of the first and second arms, such that, in response to changes in an electrical signal supplied to the electrode, an electric field is generated in said one of the first and second arms that changes a refractive index in said one of the first and second arms.

10. An apparatus in accordance with claim 9, wherein the first angle equals the third angle and the second angle equals the fourth angle.

11. An apparatus in accordance with claim 9, wherein a length of the first arm is substantially the same as a length of the second arm.

12. An apparatus, comprising:

a Mach-Zehnder (MZ) interferometer having first and second arms, the first and second arms being spaced from one another by a distance that is 40 microns or less, such that a temperature of the first arm is substantially the same as a temperature of the second arm during operation of the MZ interferometer in which the MZ interferometer outputs a modulated optical signal, the first arm has a bent portion and the second arm has a bent portion, the bent portion of the second arm being provided within a region bounded by the bent portion of the second arm;

a first drive electrode provided on a first portion of the first arm, such that, in response to changes in an electrical signal supplied to the first drive electrode, an electric field is generated in the first arm that changes a refractive index in the first arm;

a second drive electrode provided on a second portion of the first arm, the first and second drive electrodes being separated from one another by a gap over a third portion of the first arm;

a third drive electrode provided on the second arm;

a first contact electrode that provides a first voltage to the first and second drive electrodes; and a second contact electrode that provides a second voltage to the third drive electrode, a portion of the second contact electrode extending over the third portion of the first arm.

13. An apparatus in accordance with claim 12, wherein the MZ interferometer is a first MZ interferometer and the gap is a first gap, the apparatus further including:

a second MZ interferometer having third and fourth arms;

a fourth drive electrode provided on a first portion of the third arm;

a fifth drive electrode provided on a second portion of the third arm, the fourth and fifth drive electrodes being separated from one another by a second gap over a third portion of the third arm;

a sixth drive electrode provided on the fourth arm;

a third contact electrode that provides a third voltage to the fourth and fifth drive electrodes; and a fourth contact electrode that provides a fourth voltage to the sixth drive electrode, the fourth contact electrode extending over the third portion of the third arm.

* * * * *